(12) United States Patent
Stephens et al.

(10) Patent No.: US 9,143,190 B2
(45) Date of Patent: Sep. 22, 2015

(54) SYSTEM AND METHOD FOR DEMODULATING AN INCOMING SIGNAL

(71) Applicants: James A. Stephens, Chandler, AZ (US); Dominique Delbecq, Fonsorbes (FR); Daniel M. Perrine, Phoenix, AZ (US)

(72) Inventors: James A. Stephens, Chandler, AZ (US); Dominique Delbecq, Fonsorbes (FR); Daniel M. Perrine, Phoenix, AZ (US)

(73) Assignee: FREESCALE SEMICONDUCTOR,INC, Austin, TX (US)

( * ) Notice: Subject to any disclaimer, the term of this patent is extended or adjusted under 35 U.S.C. 154(b) by 240 days.

(21) Appl. No.: 13/916,146

(22) Filed: Jun. 12, 2013

(65) Prior Publication Data

US 2014/0254636 A1 Sep. 11, 2014

(51) Int. Cl.
*H04B 1/00* (2006.01)
*H04B 1/709* (2011.01)

(52) U.S. Cl.
CPC .................................... *H04B 1/709* (2013.01)

(58) Field of Classification Search
CPC .... H04B 1/7073; H04B 1/7087; H04B 1/709; H04B 7/2628
See application file for complete search history.

(56) References Cited

U.S. PATENT DOCUMENTS

| | | | |
|---|---|---|---|
| 4,426,712 A * | 1/1984 | Gorski-Popiel | 375/343 |
| 4,550,414 A * | 10/1985 | Guinon et al. | 375/150 |
| 5,390,207 A * | 2/1995 | Fenton et al. | 375/149 |
| 6,055,264 A * | 4/2000 | Kenney et al. | 375/150 |
| 6,128,331 A * | 10/2000 | Struhsaker et al. | 375/142 |
| 6,263,013 B1 * | 7/2001 | Hendrickson | 375/150 |
| 6,363,049 B1 * | 3/2002 | Chung | 370/210 |
| 6,459,721 B1 * | 10/2002 | Mochizuki et al. | 375/130 |
| 6,771,715 B1 * | 8/2004 | Rives et al. | 375/327 |
| 7,123,670 B2 | 10/2006 | Gilbert et al. | |
| 7,315,590 B1 * | 1/2008 | Okuyama et al. | 375/344 |
| 2002/0072854 A1 * | 6/2002 | Fuchs et al. | 701/213 |
| 2003/0147457 A1 * | 8/2003 | King et al. | 375/148 |
| 2003/0202569 A1 * | 10/2003 | Kim et al. | 375/150 |

(Continued)

OTHER PUBLICATIONS

Moeller, F.; Belkerdid, M.A.; Malocha, D.C.; Buff, W., "Differential phase shift keying direct sequence spread spectrum single SAW based correlator receiver," Ultrasonics, Ferroelectrics, and Frequency Control, IEEE Transactions on , vol. 45, No. 3, pp. 537,538, May 1998.*

(Continued)

*Primary Examiner* — Daniel Washburn
*Assistant Examiner* — Amneet Singh
(74) *Attorney, Agent, or Firm* — Sherry W. Schumm (57) ABSTRACT

Methods and receiver circuits are provided for correlating an incoming signal with PN codes. An embodiment of the method includes receiving I/Q baseband samples in the I/Q domain; converting the I/Q baseband samples to phase baseband samples; generating a pseudonoise (PN) code; converting the PN code to PN phase data; performing a correlation on the phase baseband samples using the PN phase data to generate correlated I/Q values; performing an adding operation on the correlated I/Q values to generate demodulated I/Q values; converting the demodulated I/Q values into demodulated phase values; performing a frequency correction operation on the demodulated phase values to generate frequency correction data; converting the demodulated I/Q values into demodulated magnitude values; and performing signal decoding and synchronization on the magnitude values to generate output data. The operation of performing correlation on the phase baseband samples using the PN phase data is accomplished using scalar subtraction.

17 Claims, 5 Drawing Sheets

(56) References Cited

U.S. PATENT DOCUMENTS

| | | | |
|---|---|---|---|
| 2006/0093070 A1* | 5/2006 | Ibrahim et al. | 375/324 |
| 2007/0104297 A1* | 5/2007 | Gorday | 375/343 |
| 2008/0205492 A1* | 8/2008 | Gorday et al. | 375/150 |
| 2008/0215269 A1* | 9/2008 | Chugg et al. | 702/67 |
| 2009/0310653 A1* | 12/2009 | Gorday | 375/149 |

OTHER PUBLICATIONS

Luise et al, "Carrier Frequency Recovery in All-Digital Modems for Burst-Mode Transmissions", IEEE Transactions on Communications, vol. 43, No. 2/3/4, Feb./Mar./Apr. 1995, pp. 1169-1178.

* cited by examiner

SYSTEM AND METHOD FOR DEMODULATING AN INCOMING SIGNAL

FIELD OF THE INVENTION

Embodiments of the present invention relate in general to a system and method for demodulating an incoming signal. In particular they relate to demodulation circuits and methods that perform correlation and autocorrelation in the phase domain, and employ a single correlator element to achieve frequency offset estimation and demodulation/decoding of an incoming signal.

BACKGROUND OF THE INVENTION

In a wireless data transmission scheme, in order to demodulate and decode an incoming signal it is generally necessary to synchronize the clock of an incoming signal with a local clock on the receiver. This requires the receiver to first determine a frequency offset of the incoming signal with respect to the local clock before it can begin demodulating in decoding the signal.

One way of determining a frequency offset involves performing autocorrelation on samples of the incoming signal and looking for maximum points. Based on the location of these maximum points, the receiver can determine a frequency offset value between the clock of the incoming signal and the receiver's local clock.

Once the frequency correction value is determined, the receiver can then proceed to a demodulation and decoding operation. During this operation, the receiver will perform correlation of the incoming signal with a known PN code to identify where the symbols (i.e., chips) are.

Conventional frequency offset estimation and demodulation/decoding operations are performed on I/Q data. When I/Q data is used, both correlation and autocorrelation require the receiver to perform complex multiplication. This complex multiplication is a complicated operation that requires significant circuitry to implement. Furthermore, as the amount of circuitry required increases, so too does the amount of power that circuitry uses, and the space required on a chip to form that circuitry.

In addition, conventional frequency offset estimation requires that multiple autocorrelation values be generated to determine a frequency offset estimate. Also, each autocorrelation value that must be calculated requires additional time and additional power.

Furthermore, conventional frequency offset estimation and demodulation/decoding operations are implemented using separate circuitry for each of these tasks. This serves to further increase the power requirements for a signal demodulator, as well as the required surface area of a chip required to contain the signal demodulator.

It would therefore be desirable to provide a signal demodulation circuit and method that is relatively simple in design, may require lower power than conventional demodulation circuits, may operate more quickly than conventional demodulation circuits, and may take up less space on a chip than conventional demodulation circuits.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made or claims added during the pendency of this application and any applications claiming priority to this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with or in integrated circuits (ICs), such as dynamic random access memory (DRAM) devices, static random access memory (SRAM) devices, or the like. In particular, they may be implemented using CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs will be limited to the essentials with respect to the principles and concepts used by the exemplary embodiments.

Signal Demodulator

Figure 1:
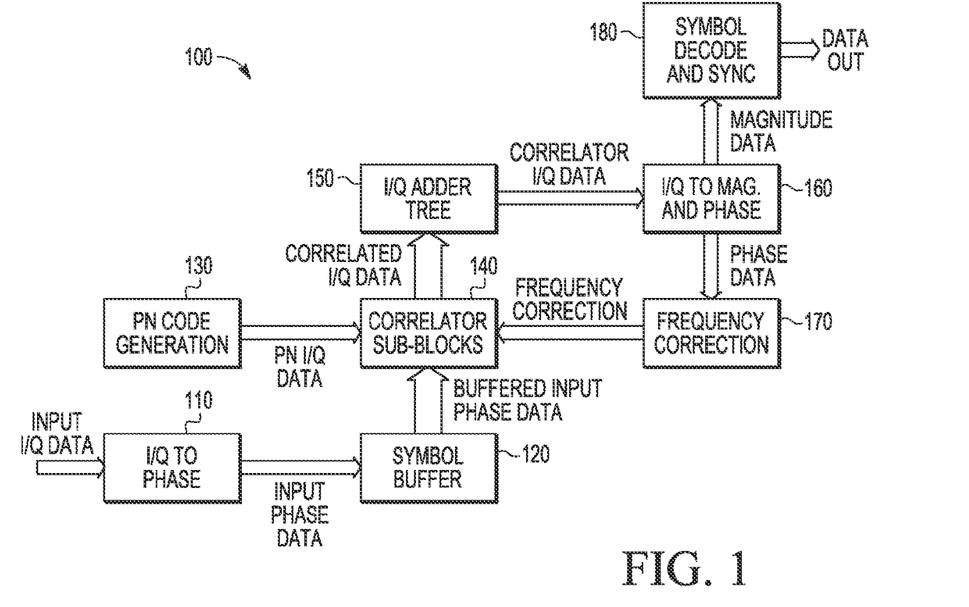
FIG. 1 is a block diagram of a signal demodulator according to a disclosed embodiment.

FIG. 1 is a block diagram of a signal demodulator 100 according to a disclosed embodiment. In operation, this signal demodulator 100 will receive an incoming signal, determine a frequency offset value for that incoming signal, and then proceed to demodulate and decode the incoming signal.

The embodiment described in FIG. 1 provides two different ways of performing a frequency offset determination. The first way of performing frequency offset determination is through non-coherent detection (NCD). The NCD process offers a high level of sensitivity, but may require slightly more power, as well as a known preamble, or the like, in the incoming signal. The second way of performing a frequency offset determination is through differential chip detection (DCD). The DCD process may have lower sensitivity then the NCD process, but may require lower power and can be used for clear channel assessment, which can be used when there is no preamble. For the purposes of the discussion below, the NCD process will be referred to generally as a frequency correction mode, while the DCD process will be referred to generally as a differential mode.

As shown in FIG. 1, the signal demodulator 100 includes an I/Q to phase converter 110, a symbol buffer 120, a PN code generation element 130, a correlator sub-blocks element 140, an I/Q tree adder 150, an I/Q to magnitude and phase converter 160, a frequency correction element 170, and a symbol decode and synchronization element 180. This signal demodulator 100 can be implemented as a phase shift key (PSK) direct sequence spread spectrum (DSSS) demodulator.

The I/Q to phase converter 110 receives input I/Q data (e.g., from an incoming data packet) and converts it from I/Q format into phase format, producing input phase data as scalar phase values. In doing this, magnitude information is discarded. This is not a problem if no data is encoded in the magnitude of the input signal. Therefore, this signal demodulator 100 may be limited to systems that encode data using phase.

The symbol buffer 120 operates to buffer N data bits of the input phase data, where N is equal to the symbol size. For example, if the symbol size were 32, the symbol buffer would buffer 32 data bits of the input phase data.

The PN code generation element 130 operates to generate a pseudo noise (PN) code in I/Q format. This PN code is also N bits in length (i.e., equal in length to the symbol size). Thus, if the symbol size were 32, the PN code generation element 130 would output 32 bits of PN I/Q data.

The correlator sub-blocks element 140 receives the buffered input phase data from the symbol buffer 120, the PN I/Q data from the PN code generation element 130, and a frequency correction signal having N frequency correction values from the frequency correction element 170. The correlator sub-blocks element 140 uses these three inputs to perform one of two functions: autocorrelation on the buffered input phase data, or correlation with frequency compensation. The autocorrelation function can be performed according to either the frequency correction mode or the differential mode.

The correlator sub-blocks element 140 can perform autocorrelation on the buffered input phase data to generate information that is used by the frequency correction element 170 to generate the frequency correction values. This is typically done at the beginning of a data packet (e.g., during the preamble), when a frequency correction value is not known, but no data is being sent.

The correlator sub-blocks element 140 can also perform correlation with frequency compensation to generate information that is used by the symbol decode and synchronization element 180 to process data for decoding. This is typically done during a data portion of a packet, after frequency correction information has been determined during an earlier portion of the packet (e.g., during the preamble).

The correlator sub-blocks element 140 includes N individual correlator sub-blocks. Thus, if the symbol size were 32, the correlator sub-blocks element 140 would include 32 individual correlator sub-blocks. Each individual correlator sub-block receives one bit of the buffered input phase data, one bit of the PN I/Q data, and one frequency correction value. A correlator sub-block converts the bit of PN I/Q data into a scalar phase value, and subtracts the PN phase value from the bit of input phase data to create a residual signal. Each correlator sub-block receives an immediately previous residual signal, and a previous residual signal from several sub-blocks previous to the current correlator sub-block (excepting sub-blocks at the front of the correlator sub-blocks element 140, which do not have the appropriate previous sub block or blocks). In the embodiment disclosed in FIGS. 1 to 3, the previous residual signal from several sub-blocks previous is from four sub-blocks previous. However, this is merely by way of example.

If the correlator sub-blocks element 140 is performing autocorrelation, then each individual correlator sub-block subtracts one of the previous residual signals from a current residual signal to generate correlated phase data. In particular, if the immediately previous residual signal is used, autocorrelation is performed in the differential mode. Likewise, if a residual signal from several sub-blocks previous is used, the autocorrelation is performed in the frequency correction mode.

If, however, the correlator sub-blocks element 140 is performing correlation with frequency correction, then each individual correlator sub-block subtracts the appropriate frequency correction value from the current residual signal to generate the correlated phase data. In either case, the correlated phase data is then converted back into I/Q format to form N complex values of correlated I/Q data.

Thus, the correlator sub-blocks element 140 receives N bits of input phase data, N bits of PN phase data, and N frequency correction values, and generates N complex values of correlated or autocorrelated complex values.

The I/Q tree adder 150 takes the N pieces of correlated I/Q data and adds them together in an adder tree to generate N bits of correlator I/Q data. If the correlator sub-blocks element 140 has performed autocorrelation function, the correlator I/Q data includes information in its phase that can be used by the frequency correction element 170 to generate the frequency correction signal. If, however the correlator sub-blocks element 140 has performed a correlation function, the correlator I/Q data includes information in its magnitude that can be used by the symbol decode and synchronization element 180 to generate decoded output data.

The I/Q to magnitude and phase converter 160 operates to convert the correlator I/Q data into phase data, which is provided to the frequency correction element 170, and magnitude data, which is provided to the symbol decode and synchronization element 180.

The frequency correction element 170 receives the phase data from the I/Q to magnitude and phase converter 160 and uses this phase data to generate the frequency correction signal. In particular, the frequency correction element 170 may quantize the phase data into a smaller size using a lookup table so that the smaller phase data may be provided as an individual frequency correction value. For example, the phase data might be a 9-bit value, while a frequency correction value might be a 5-bit value. In such a case, the frequency correction element 170 would receive a 9-bit piece of phase data and convert it, using a lookup table, to a 5-bit frequency correction. The frequency correction signal is a vector containing N frequency correction values. Typically, the best frequency estimate, as determined by the largest correlation magnitude from several preamble symbols, is used for demodulation of the rest of a packet of data.

The symbol decode and synchronization element 180 receives the magnitude data from the I/Q to magnitude and phase converter 160, and uses this magnitude data to generate output data, once the preamble is finished and a data portion of the packet is received.

Thus, the signal demodulator 100 of FIG. 1 uses the same data path hardware for frequency offset estimation, data demodulation with automatic frequency correction and data demodulation using differential decoding. During a frequency offset estimation period (e.g., during a preamble of a received packet), the correlator sub-blocks element 140 performs autocorrelation to estimate a frequency offset. However, during a dated decoding period (e.g., during a data portion of a received packet), the same correlator sub-blocks element 140 performs correlation with frequency compensation or correlation using differential decoding. In this way, the signal demodulator 100 is simplified compared to a conventional design, and the amount of required circuitry is reduced.

Furthermore, by performing autocorrelation, and correlation with frequency compensation functions in the phase domain, the signal demodulator 100 of FIG. 1 can implement these functions using scalar subtraction operations. In contrast, if these functions were performed in the I/Q domain these functions likely would be implemented using a complex multiplication, which may be a more complicated and power-hungry operation to implement.

Correlator Sub-Blocks

Figure 2:
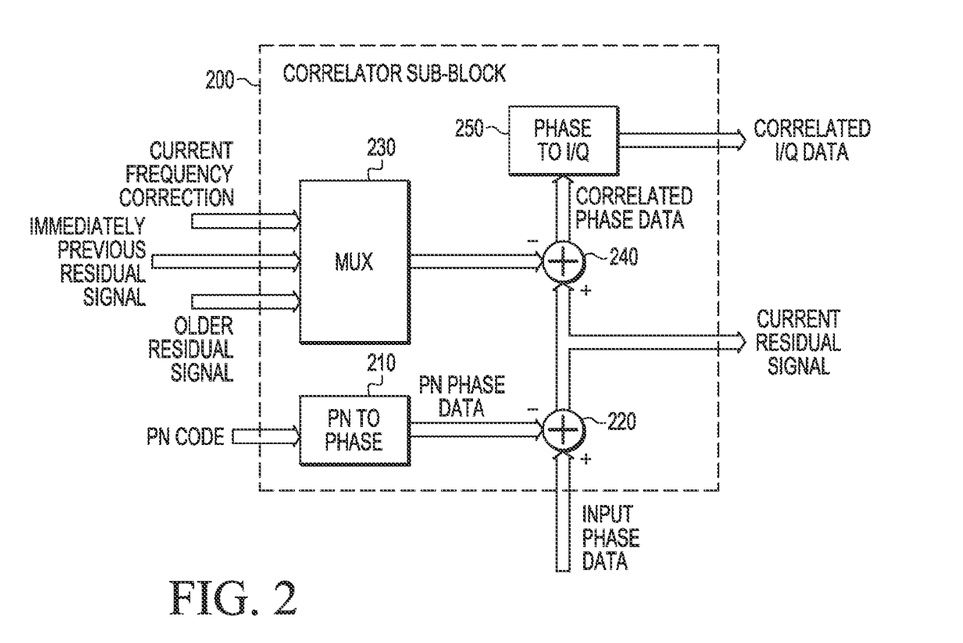
FIG. 2 is a block diagram of a correlator sub-block from the signal demodulator of FIG. 1 according to a disclosed embodiment.

FIG. 2 is a block diagram of an individual correlator sub-block 200 from the signal demodulator of FIG. 1 according to a disclosed embodiment. As shown in FIG. 2, an individual correlator sub-block 200 includes a PN-to-phase converter 210, a first subtractor 220, a multiplexer 230, a second subtractor 240, and a phase-to-I/Q converter 250.

The PN-to-phase converter 210 receives a bit of the PN code in the I/Q domain, and converts it to a phase value to generate one bit of PN phase data.

The first subtractor 220 receives one bit of input phase data and subtracts the one bit of PN phase data from the one bit of input phase data to generate a current residual signal for the correlator sub-block 200.

The multiplexer 230 receives a current frequency correction value, an immediately previous residual signal from an immediately previous correlator sub-block, and an older residual signal from a correlator sub-block several positions previous to the current correlator sub-block 200. Based on a control signal (not shown), the multiplexer 230 selects one of these three signals as an output signal. In the disclosed embodiment, the older residual signal is from a correlator sub-block that is four positions previous to the current correlator sub-block 200. However, this is by way of example only. In alternate embodiments, the older residual signal can be from a correlator sub-block that is more or less than four positions previous. In general, an autocorrelation lag (i.e., how many positions previous to the current correlator sub blocks 200 is the correlator sub block that provides the older residual signal) is selected to be greater than one and as large as it can be without introducing aliasing.

The second subtractor 240 subtracts the output of the multiplexer 230 from the current residual signal to generate correlated phase data. This correlated phase data represents something different, depending upon which of the inputs of the multiplexer 230 is selected as output of the multiplexer 230.

When the multiplexer 230 selects the older residual signal from a correlator sub-block several positions previous to the current correlator sub-block 200, the signal demodulator 100 is operating in the frequency correction mode, in which an autocorrelation between two received symbols, separated in time by a set amount, is used to determine an estimate for a frequency correction value. In this case, the correlated phase data represents information that can be used by the frequency correction element 170 to generate frequency correction values. More specifically, the phase of the autocorrelation value is proportional to the frequency offset. This allows the autocorrelation operation to use a single autocorrelation value for frequency estimation rather than multiple autocorrelation values.

When the multiplexer 230 selects the immediately previous residual signal as an output signal, the signal demodulator 100 is operating in the differential mode, in which the immediately previous residual signal is effectively used as the frequency correction value. As shown in FIG. 2, the demodulation process is the same between a decoding mode and a differential mode, with the exception that instead of using a previously calculated frequency correction value (in the decoding mode), the immediately previous residual signal is used (in the differential mode). In the differential mode, the values from the frequency correction block 170 are not used.

When the multiplexer 230 selects the current frequency correction value as an output signal, the signal demodulator 100 is operating in a decoding mode, in which a correlation between input phase data and a PN code, corrected for frequency, is used to decode the information contained in the input phase data. However, this operation can only be performed once the frequency correction values have been determined.

The phase-to-I/Q converter 250 operates to convert the correlated phase data into correlated I/Q data.

Figure 3:
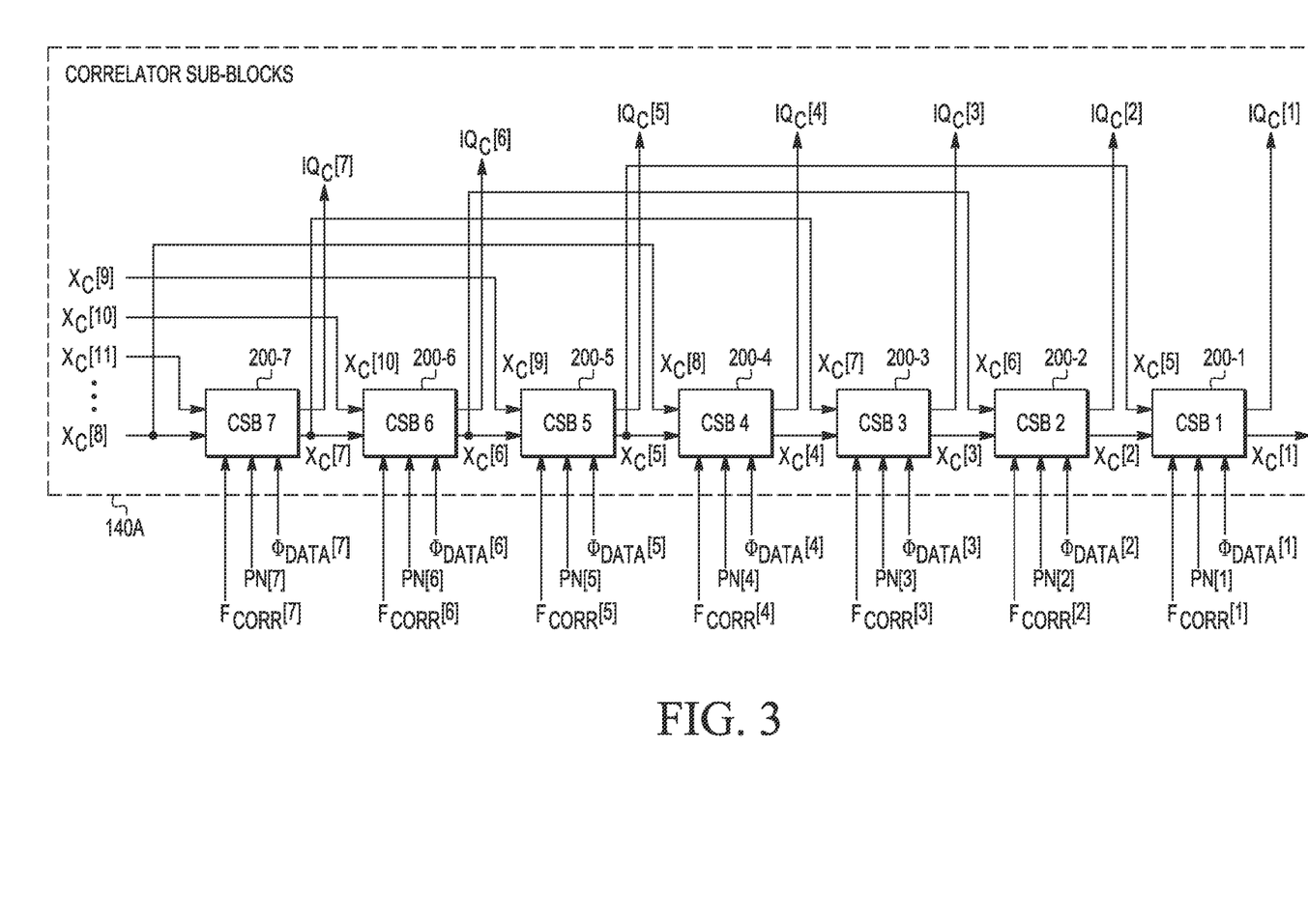
FIG. 3 is a block diagram of a front portion of the correlator sub-blocks element from the signal demodulator of FIG. 1 where N is 32 according to a disclosed embodiment.
Figure 4:
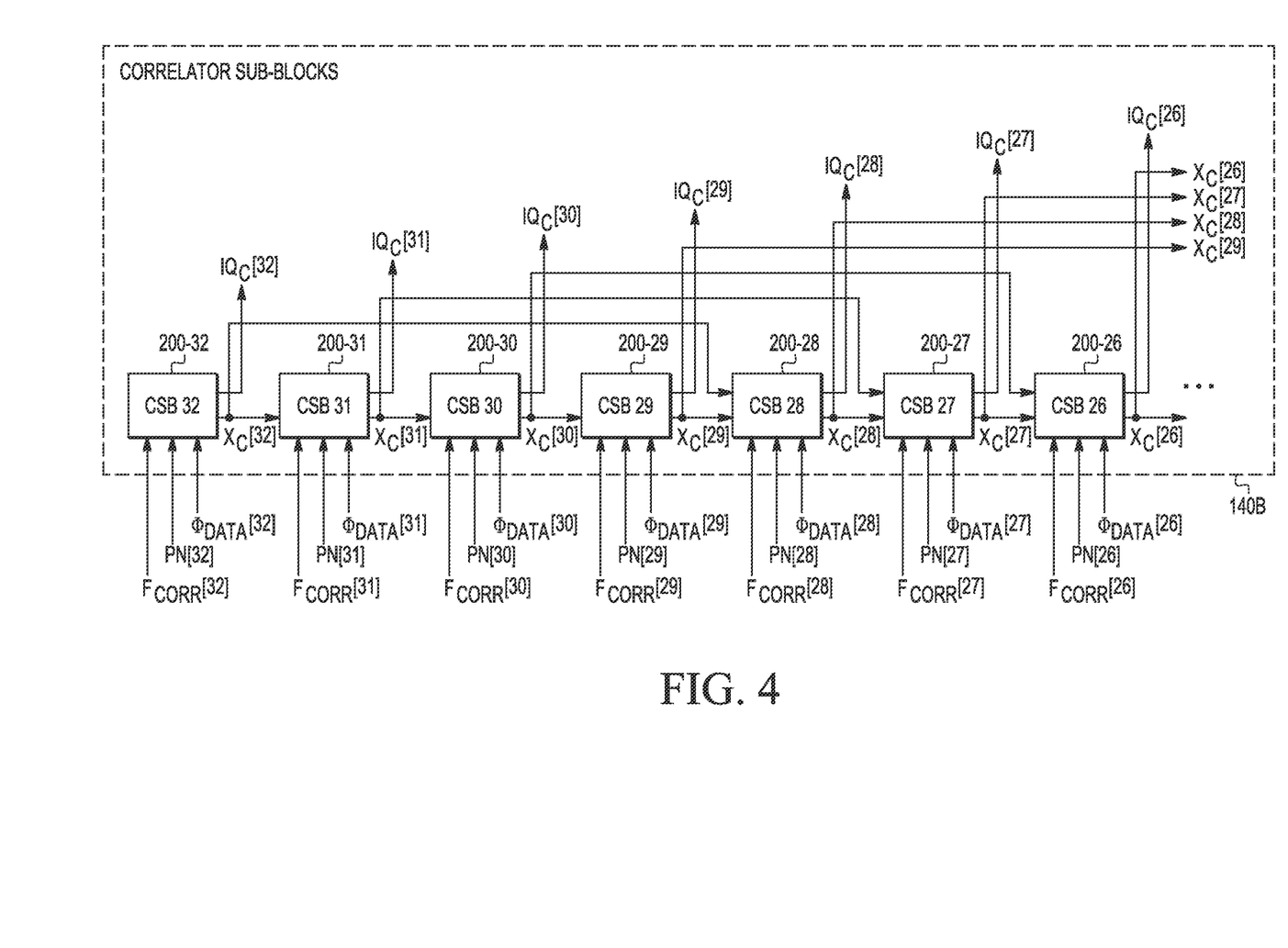
FIG. 4 is a block diagram of a back portion of the correlator sub-blocks element from the signal demodulator of FIG. 1 where N is 32 according to a disclosed embodiment.

FIG. 3 is a block diagram of a front portion 140A of the correlator sub-blocks element 140 from the signal demodulator of FIG. 1 where N is 32 according to a disclosed embodiment, while FIG. 4 is a block diagram of a back portion 140B of the correlator sub-blocks element 140 from the signal demodulator of FIG. 1 where N is 32 according to the disclosed embodiment. FIG. 3 illustrates the last seven correlator sub-blocks 200-25, 200-27, 200-28, 200-29, 200-30, 200-31, 200-32 in the correlator sub-blocks element 140, and 4 illustrates the first seven correlator blocks 200-1, 200-2, 200-3, 200-4, 200-5, 200-6, 200-7 in the correlator sub-blocks element 140. As shown in FIGS. 3 and 4, each $i^{th}$ correlator sub-block 200-$i$ receives an $i^{th}$ frequency correction value $F_{CoRR[i]}$, an $i^{th}$ PN bit value PN[i], an $i^{th}$ buffered input bit phase value $_{DATA}[i]$, an $(i+1)^{th}$ residual value $x_C[i+1]$, and an $(i+4)^{th}$ residual value $x_C[i+4]$. Each $i^{th}$ correlator sub-block 200-$i$ generates an $i^{th}$ residual value $x_C[i]$ and an $i^{th}$ correlated I/Q data value $IQ_c[i]$.

The first through $32^{nd}$ correlated I/Q data values $IQ_c[1]$-$IQ_c[32]$ are provided to the I/Q adder tree 150 as the 32 correlated I/Q data values.

In this exemplary embodiment, i varies from 1 to 32. However, more generically, i can vary from 1 to N, for any selected value of N. N is selected in some embodiments to be equal to the symbol size. The connections of a length N correlator sub-block element 140 would be comparable to the connections shown in FIGS. 3 and 4 for a length 32 correlator sub-block element 140.

In addition, it should be noted that, because i only goes as high as 32 (i.e., N) in the disclosed embodiment, there is no $33^{rd}$ $((N+1)^{th})$ correlator sub-block, so the $32^{nd}$ $(N^{th})$ correlator sub-block 200-32 (200-N) does not receive a $33^{rd}$ residual signal $x_C[33]$ ($x_C[N+1]$) (i.e., an immediately previous residual signal). Similarly, the $29^{th}$ correlator sub-block 200-29 does not receive a $33^{rd}$ residual signal $x_C[33]$ ($x_C[N+4]$), since there is no $33^{rd}$ $((N+1)^{th})$ correlator sub-block; the $30^{th}$ correlator sub-block 200-30 does not receive a $34^{th}$ residual signal $x_C[34]$ ($x_C[N+2]$), since there is no $34^{th}$ $((N+2)^{th})$ correlator sub-block; the $31^{st}$ correlator sub-block 200-31 does not receive a $35^{th}$ residual signal $x_C[35]$ ($x_C[N+3]$), since there is no $35^{th}$ $((N+3)^{th})$ correlator sub-block; and the $32^{nd}$ correlator sub-block 200-32 does not receive a 36$^{th}$ residual signal $x_C[36]$ ($x_C[N+4]$), since there is no 36$^{th}$ ((N+4)$^{th}$) correlator sub-block. In other words, these correlator sub-blocks 200-29, 200-30, 200-31, 200-32 do not receive the older previous residual signal. The operation of these correlator sub-blocks 200-29, 200-30, 200-31, 200-32 is adjusted to account for these missing input signals.

A receiver circuit is provided, comprising: a first conversion circuit configured to convert received I/Q baseband samples in the I/Q domain to phase baseband samples in the phase domain; a symbol buffer configured to store one symbol length of phase baseband samples; a pseudonoise (PN) code generator configured to generate a PN code; a correlator circuit configured to correlate one symbol length of the phase baseband samples with the PN code in the phase domain to generate correlated I/Q data using frequency correction data; an I/Q adder tree configured to perform an adding operation on the correlated I/Q data to generate demodulated I/Q data; a third conversion circuit configured to convert the demodulated I/Q data to demodulated magnitude data and demodulated phase data; a frequency correction circuit configured to generate the frequency correction data based on the demodulated phase data; and a symbol decode and synchronization circuit configured to generate decoded output data based on the demodulated magnitude data, wherein the correlator circuit is configured to correlate the phase baseband samples with the PN code using scalar subtraction.

The correlator may further comprise N correlator sub-blocks connected in series with each other, an i$^{th}$ correlator sub-block including: an i$^{th}$ PN conversion circuit configured to convert the PN code to i$^{th}$ PN phase data; an i$^{th}$ PN subtractor configured to subtract the i$^{th}$ PN phase data from an i$^{th}$ portion of the phase baseband samples to generate an i$^{th}$ residual signal; an i$^{th}$ correction subtractor configured to subtract an i$^{th}$ correction value from the i$^{th}$ residual signal to generate an i$^{th}$ correlated phase value; and a phase conversion circuit configured to convert the i$^{th}$ correlated phase value to an i$^{th}$ correlated I/Q value, wherein the i$^{th}$ correction value is one of: an i$^{th}$ frequency offset, an (i−1)$^{th}$ residual signal, or an (i−x)$^{th}$ residual signal, where i is an integer that varies from 1 to N, and where x is an integer greater than 1.

The i$^{th}$ correction value may be the (i−x)$^{th}$ residual signal, and the i$^{th}$ correlated phase values may be represent the current frequency offset.

The correlator circuit may be further configured to correlate a plurality of symbol lengths of the phase baseband samples with the PN code in the phase domain to generate a plurality of sets of correlated I/Q data using the (i−x)$^{th}$ residual signal in each of the correlator sub-blocks, the frequency correction circuit may be further configured to generate the frequency correction data based on a plurality of sets of demodulated phase data, and a final set of frequency correction data may be selected to be a set of frequency correction data associated with a set of correlated I/Q data having a largest correlation magnitude.

When the correction value is the i$^{th}$ frequency offset, the i$^{th}$ correlated phase values may represent correlated phase data. When the correction value is the (i−1)$^{th}$ residual signal, the i$^{th}$ correlated phase values may represent an estimated frequency offset.

A receiver circuit is provided, comprising: means for receiving I/Q baseband samples in the I/Q domain; means for converting the I/Q baseband samples to phase baseband samples; means for generating a pseudonoise (PN) code; means for converting the PN code to PN phase data; means for performing a correlation on the phase baseband samples using the PN phase data to generate correlated I/Q values; means for performing an adding operation on the correlated I/Q values to generate demodulated I/Q values; means for converting the demodulated I/Q values into demodulated phase values; means for performing a frequency correction operation on the demodulated phase values to generate frequency correction data; means for converting the demodulated I/Q values into demodulated magnitude values; and means for performing signal decoding and synchronization on the magnitude values to generate output data, wherein the means for performing correlation on the phase baseband samples using the PN phase data is configured to perform the correlation using scalar subtraction.

The means for performing a correlation may further comprise: means for subtracting the PN phase data from the phase baseband samples to generate a current residual signal; means for subtracting a correction value from the current residual signal to generate correlated phase values; and means for converting the correlated phase values to the correlated I/Q values, wherein the correction value is one of: a current frequency offset, an immediately previous residual signal, or an older residual signal generated prior to the immediately previous residual signal.

When the correction value is the older residual signal, the correlated phase values may represent the current frequency offset.

The means for performing a correlation may be further configured to generate a plurality of sets of correlated I/Q values, the means for performing a frequency correction operation may be further configured to convert the plurality of sets of correlated I/Q values to a plurality of sets of frequency correction data, and a final set of frequency correction data may be selected to be a set of frequency correction data associated with a set of correlated I/Q values having a largest correlation magnitude.

When the correction value is the frequency offset, the correlated phase values represent correlated phase data. When the correction value is the immediately previous residual signal, the correlated phase values represent an estimated frequency offset.

During a preamble, the correlation operation may require two clock cycles, and the estimated frequency offset may be used as the current frequency offset.

Method of Demodulating an Incoming Signal

Figure 5:
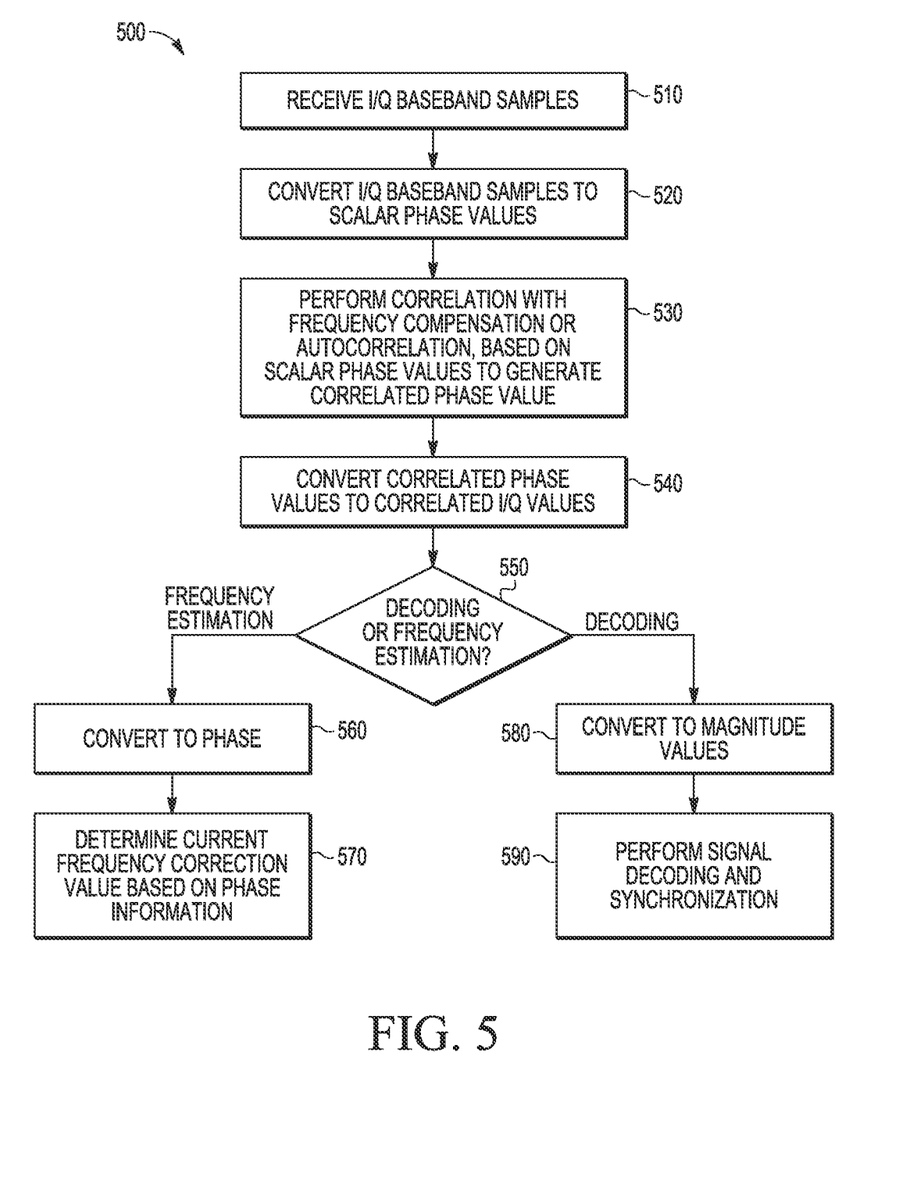
FIG. 5 is flow chart showing a method of demodulating an incoming signal according to a disclosed embodiment.

FIG. 5 is flow chart showing a method of demodulating an incoming signal according to a disclosed embodiment. As shown in FIG. 5, operation begins when a signal demodulator receives a plurality of I/Q baseband samples (510). These I/Q baseband samples can come directly from an antenna, from a front end processor, or any similar source.

The signal demodulator then converts the I/Q baseband samples to scalar phase values (520). In doing so, the signal demodulator discards the magnitude data, which reduces the required number of registered bits in a symbol buffer that receives the scalar phase values. As noted above, this does not inhibit a decoding operation if data is only encoded in the phase of the incoming signal.

The signal demodulator then performs correlation with frequency compensation or autocorrelation, based on the scalar phase values in order to generate correlated phase values (530). The system performs autocorrelation during a frequency offset determination period, and performs correlation with frequency compensation during a demodulation/decoding period that occurs after the frequency offset determination period.

In some embodiments, both the autocorrelation and correlation with frequency compensation will be performed on a symbol basis. In other words, autocorrelation and correlation with frequency compensation will be performed on a data sample that has a length equal to the symbol size.

The correlated phase values are then converted to correlator I/Q values (540). In some embodiments, this operation can be accomplished through the use of an adder tree.

Once the correlator I/Q values are determined, the signal demodulator determines whether they will be used for decoding or for frequency estimation (550). This decision occurs because the same circuitry is used for both decoding and frequency estimation. Therefore, a determination is made as to what the correlator I/Q values represent.

If a frequency estimation operation is being performed, the correlator I/Q values are converted to scalar phase values (560), and these scalar phase values are used to determine a current frequency correction value (i.e., a frequency offset) (570). In one embodiment, the determination of a current frequency correction value can be determined by examining autocorrelation values from several preamble symbols and selecting the result associated with the largest correlation magnitude.

If, however, a decoding operation is being performed, the correlator I/Q values are converted to magnitude values (580), and these magnitude values are used to perform signal decoding and synchronization (590).

In this way, the same initial operations can be performed in the same circuitry, regardless of whether a frequency estimation operation or a decoding operation is being performed. This can serve to simplify both the frequency estimation and decoding processes, as well as the circuitry required to implement them.

Figure 6:
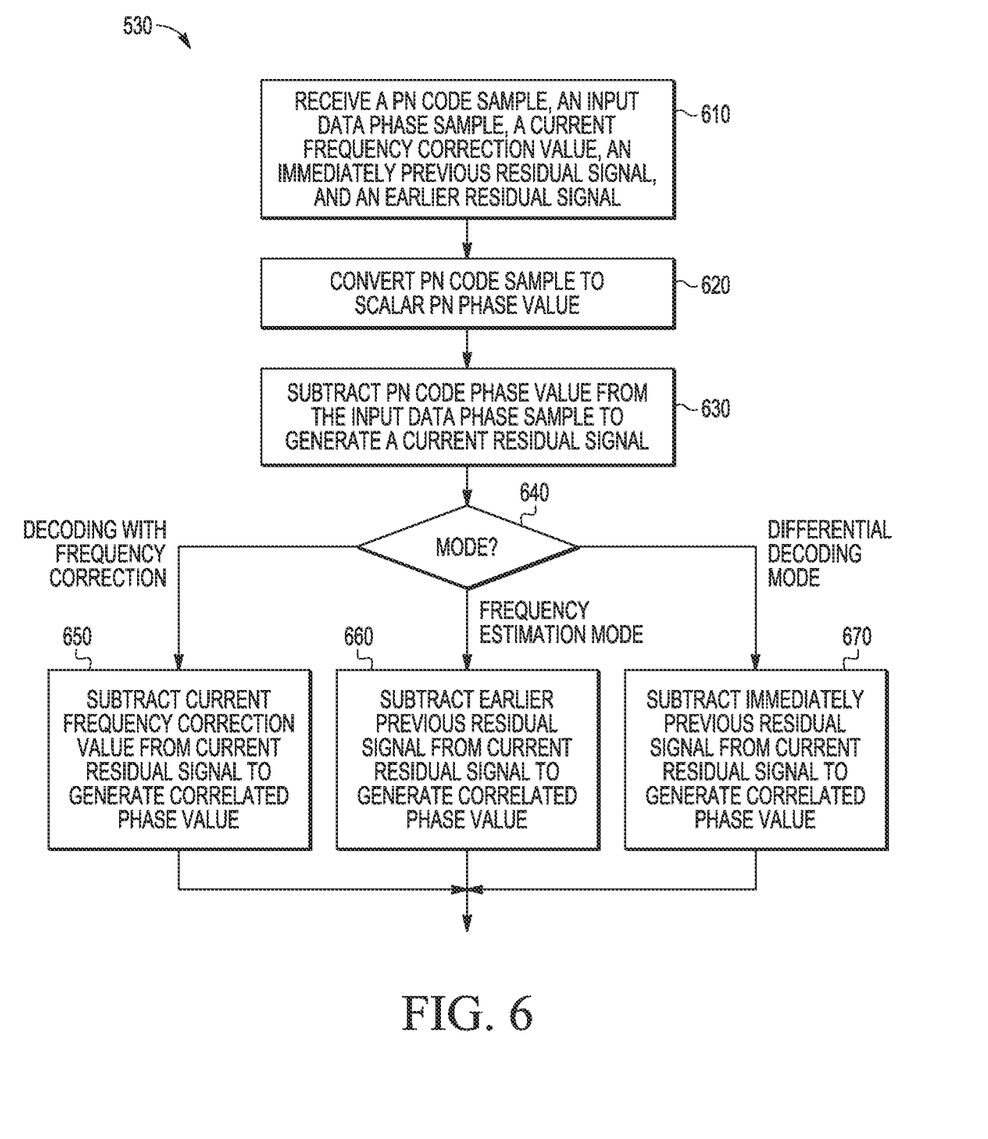
FIG. 6 is a flow chart showing the operation of performing correlation or autocorrelation of FIG. 5 according to a disclosed embodiment.

FIG. 6 is a flow chart showing the operation of performing correlation or autocorrelation 530 of FIG. 5 according to a disclosed embodiment.

As shown in FIG. 6, this process begins by receiving one pseudo noise (PN) code sample, one input data phase sample, a frequency correction value, an immediately previous residual signal, and an earlier residual signal (610).

The PN code sample is then converted to a scalar PN phase value (620). This PN phase value is then subtracted from the input data phase sample to generate a current residual signal (630). This operation is essentially a correlation operation between the PN phase value and the input data phase sample. However, because this operation is taking place in the phase domain, it is performed using a scalar subtraction operation, rather than a complex multiplication operation.

A determination is then made as to what mode the input decoder is operating in (640). In particular, it could be operating in a decoding mode, a frequency estimation mode, or a differential decoding mode.

If the signal decoder is operating in the decoding mode the current frequency correction value is subtracted from the current residual signal to generate the correlated phase value (650). In this case, the correlated phase value represents a correlation between the PN code sample and the input data phase sample, with frequency correction.

If the signal decoder is operating in the frequency estimation mode, the earlier residual signal is subtracted from the current residual signal to generate the correlated phase value (660). In this case, the correlated phase value represents an autocorrelation of the input data phase sample with an autocorrelation of lag equal to the distance between the earlier residual signal and the current residual signal.

If the signal decoder is operating in the differential decoding mode, the immediately previous residual signal is subtracted from the current residual signal to generate the correlated phase value (670).

Regardless of whether the signal decoder is operating in the decoding mode, the frequency estimation mode, or the differential decoding mode, however, each of these operations (650, 660, 670) involves subtracting a single value from the current residual signal. Thus, the same circuitry can be used, regardless of the mode, providing there is a way to select between the current frequency correction value, the earlier previous residual signal, and the immediately previous residual signal.

Furthermore, although the above embodiments disclose a system and method in which both a differential decoding mode and a frequency estimation mode are provided, alternate embodiments could eliminate one of these frequency offset estimation modes.

A method for correlating an incoming signal with PN codes is provided, comprising: receiving I/Q baseband samples in the I/Q domain; converting the I/Q baseband samples to phase baseband samples; generating a pseudonoise (PN) code; converting the PN code to PN phase data; performing a correlation on the phase baseband samples using the PN phase data to generate correlated I/Q values; performing an adding operation on the correlated I/Q values to generate demodulated I/Q values; converting the demodulated I/Q values into demodulated phase values; performing a frequency correction operation on the demodulated phase values to generate frequency correction data; converting the demodulated I/Q values into demodulated magnitude values; and performing signal decoding and synchronization on the magnitude values to generate output data, wherein the operation of performing correlation on the phase baseband samples using the PN phase data is accomplished using scalar subtraction.

The method may further comprise: subtracting the PN phase data from the phase baseband samples to generate a current residual signal; subtracting a correction value from the current residual signal to generate correlated phase values; and converting the correlated phase values to the correlated I/Q values, wherein the correction value is one of: a current frequency offset, an immediately previous residual signal, or an older residual signal generated prior to the immediately previous residual signal.

The correction value may be the older residual signal, the correlated phase values may represent the current frequency offset.

The operations of receiving I/Q baseband samples, converting the I/Q baseband samples, generating a pseudonoise (PN) code, converting the PN code, and performing a correlation, may be performed multiple times to generate a plurality of sets of correlated I/Q values, the operations of performing an adding operation on the correlated I/Q values to generate demodulated I/Q values, converting the demodulated I/Q values into demodulated phase values, and performing a frequency correction operation may be performed multiple times to convert the plurality of sets of correlated I/Q values to a plurality of sets of frequency correction data, and a final set of frequency correction data may be selected to be a set of frequency correction data associated with a set of correlated I/Q values having a largest correlation magnitude.

When the correction value is the frequency offset, the correlated phase values may represent correlated phase data. When the correction value is the immediately previous residual signal, the correlated phase values may represent an estimated frequency offset. During a preamble, the correlation operation may requires two clock cycle, and the estimated frequency offset may be used as the current frequency offset.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for correlating an incoming signal with pseudonoise (PN) codes, comprising:
   receiving real/imaginary (I/Q) baseband samples in the I/Q domain;
   converting the I/Q baseband samples to phase baseband samples;
   generating, by a PN code generator, a PN code;
   converting the PN code to PN phase data;
   performing, by a correlator circuit, a correlation on the phase baseband samples using the PN phase data to generate correlated I/Q values, wherein performing the correlation includes
      subtracting the PN phase data from the phase baseband samples to generate a current residual signal,
      subtracting a correction value from the current residual signal to generate correlated phase values, wherein the correction value is one of: a current frequency offset, an immediately previous residual signal, or an older residual signal generated prior to the immediately previous residual signal, and
      converting the correlated phase values to the correlated I/Q values;
   performing an adding operation on the correlated I/Q values to generate demodulated I/Q values;
   converting the demodulated I/Q values into demodulated phase values;
   performing, by a frequency correction circuit, a frequency correction operation on the demodulated phase values to generate frequency correction data;
   converting the demodulated I/Q values into demodulated magnitude values; and
   performing signal decoding and synchronization on the magnitude values to generate output data,
   wherein the operation of performing correlation on the phase baseband samples using the PN phase data is accomplished using scalar subtraction.

2. The method of claim 1, wherein when the correction value is the older residual signal, the correlated phase values represent the current frequency offset.

3. The method of claim 2, wherein
   the operations of receiving I/Q baseband samples, converting the I/Q baseband samples, generating a pseudonoise (PN) code, converting the PN code, and performing a correlation, are performed multiple times to generate a plurality of sets of correlated I/Q values,
   the operations of performing an adding operation on the correlated I/Q values to generate demodulated I/Q values, converting the demodulated I/Q values into demodulated phase values, and performing a frequency correction operation are performed multiple times to convert the plurality of sets of correlated I/Q values to a plurality of sets of frequency correction data, and
   a final set of frequency correction data is selected to be a set of frequency correction data associated with a set of correlated I/Q values having a largest correlation magnitude.

4. The method of claim 1, wherein when the correction value is the frequency offset, the correlated phase values represent correlated phase data.

5. The method of claim 1, wherein when the correction value is the immediately previous residual signal, the correlated phase values represent an estimated frequency offset.

6. The method of claim 5, wherein during a preamble,
   the correlation operation requires two clock cycles, and
   the estimated frequency offset is used as the current frequency offset.

7. A receiver circuit, comprising:
   a first conversion circuit configured to convert received real/imaginary (I/Q) baseband samples in the I/Q domain to phase baseband samples in the phase domain;
   a symbol buffer configured to store one symbol length of phase baseband samples;
   a pseudonoise (PN) code generator configured to generate a PN code;
   a correlator circuit configured to correlate one symbol length of the phase baseband samples with the PN code in the phase domain to generate correlated I/Q data using frequency correction data, wherein the correlator comprises N correlator sub-blocks connected in series with each other, an $i^{th}$ correlator sub-block including:
      an $i^{th}$ PN conversion circuit configured to convert the PN code to $i^{th}$ PN phase data,
      an $i^{th}$ PN subtractor configured to subtract the $i^{th}$ PN phase data from an $i^{th}$ portion of the phase baseband samples to generate an $i^{th}$ residual signal,
      an $i^{th}$ correction subtractor configured to subtract an $i^{th}$ correction value from the $i^{th}$ residual signal to generate an $i^{th}$ correlated phase value, and
      a phase conversion circuit configured to convert the $i^{th}$ correlated phase value to an $i^{th}$ correlated I/Q value,
      wherein the $i^{th}$ correction value is one of: an $i^{th}$ frequency offset, an $(i-1)^{th}$ residual signal, or an $(i-x)^{th}$ residual signal,
      wherein i is an integer that varies from 1 to N, and
      wherein x is an integer greater than 1;
   an I/Q adder tree configured to perform an adding operation on the correlated I/Q data to generate demodulated I/Q data;
   a second conversion circuit configured to convert the demodulated I/Q data to demodulated magnitude data and demodulated phase data;
   a frequency correction circuit configured to generate the frequency correction data based on the demodulated phase data; and
   a symbol decode and synchronization circuit configured to generate decoded output data based on the demodulated magnitude data,
   wherein the correlator circuit is configured to correlate the phase baseband samples with the PN code using scalar subtraction.

8. The receiver circuit of claim 7, wherein when the $i^{th}$ correction value is the $(i-x)^{th}$ residual signal, and the $i^{th}$ correlated phase values represent the current frequency offset.

9. The receiver circuit of claim 7, wherein
the correlator circuit is further configured to correlate a plurality of symbol lengths of the phase baseband samples with the PN code in the phase domain to generate a plurality of sets of correlated I/Q data using the $(i-x)^{th}$ residual signal in each of the correlator sub-blocks,
the frequency correction circuit is further configured to generate the frequency correction data based on a plurality of sets of demodulated phase data, and
a final set of frequency correction data is selected to be a set of frequency correction data associated with a set of correlated I/Q data having a largest correlation magnitude.

10. The receiver circuit of claim 7, wherein when the correction value is the $i^{th}$ frequency offset, the $i^{th}$ correlated phase values represent correlated phase data.

11. The receiver circuit of claim 7, wherein when the correction value is the $(i-1)^{th}$ residual signal, the $i^{th}$ correlated phase values represent an estimated frequency offset.

12. A receiver circuit, comprising:
means for receiving real/imaginary (I/Q) baseband samples in the I/Q domain;
means for converting the I/Q baseband samples to phase baseband samples;
means for generating a pseudonoise (PN) code;
means for converting the PN code to PN phase data;
means for performing a correlation on the phase baseband samples using the PN phase data to generate correlated I/Q values, wherein the means for performing a correlation further comprises:
means for subtracting the PN phase data from the phase baseband samples to generate a current residual signal,
means for subtracting a correction value from the current residual signal to generate correlated phase values, wherein the correction value is one of: a current frequency offset, an immediately previous residual signal, or an older residual signal generated prior to the immediately previous residual signal, and
means for converting the correlated phase values to the correlated I/Q values;
means for performing an adding operation on the correlated I/Q values to generate demodulated I/Q values;
means for converting the demodulated I/Q values into demodulated phase values;
means for performing a frequency correction operation on the demodulated phase values to generate frequency correction data;
means for converting the demodulated I/Q values into demodulated magnitude values; and
means for performing signal decoding and synchronization on the magnitude values to generate output data,
wherein the means for performing correlation on the phase baseband samples using the PN phase data is configured to perform the correlation using scalar subtraction.

13. The receiver circuit of claim 12, wherein when the correction value is the older residual signal, the correlated phase values represent the current frequency offset.

14. The receiver circuit of claim 12, wherein when the correction value is the frequency offset, the correlated phase values represent correlated phase data.

15. The receiver circuit of claim 12, wherein when the correction value is the immediately previous residual signal, the correlated phase values represent an estimated frequency offset.

16. The receiver circuit of claim 15, wherein during a preamble,
the correlation operation requires two clock cycles, and
the estimated frequency offset is used as the current frequency offset.

17. A receiver circuit, comprising:
means for receiving real/imaginary (I/Q) baseband samples in the I/Q domain;
means for converting the I/Q baseband samples to phase baseband samples;
means for generating a pseudonoise (PN) code;
means for converting the PN code to PN phase data;
means for performing a correlation on the phase baseband samples using the PN phase data to generate correlated I/Q values, wherein the means for performing a correlation is further configured to generate a plurality of sets of correlated I/Q values, and wherein the means for performing a correlation is further configured to perform the correlation using scalar subtraction;
means for performing an adding operation on the correlated I/Q values to generate demodulated I/Q values;
means for converting the demodulated I/Q values into demodulated phase values;
means for performing a frequency correction operation on the demodulated phase values to generate frequency correction data, wherein the means for performing a frequency correction operation is further configured to convert the plurality of sets of correlated I/Q values to a plurality of sets of frequency correction data, and a final set of frequency correction data is selected to be a set of frequency correction data associated with a set of correlated I/Q values having a largest correlation magnitude;
means for converting the demodulated I/Q values into demodulated magnitude values; and
means for performing signal decoding and synchronization on the magnitude values to generate output data.

* * * * *